(12) United States Patent
Lessiak et al.

(10) Patent No.: US 9,003,496 B2
(45) Date of Patent: Apr. 7, 2015

(54) SECURE WIRELESS COMMUNICATION APPARATUS

(75) Inventors: Andreas Lessiak, Graz (AT); Mario Ivkovic, Graz (AT)

(73) Assignee: NXP B.V., Eindhoven (NL)

( * ) Notice: Subject to any disclaimer, the term of this patent is extended or adjusted under 35 U.S.C. 154(b) by 193 days.

(21) Appl. No.: 13/607,091

(22) Filed: Sep. 7, 2012

(65) Prior Publication Data

US 2014/0075511 A1    Mar. 13, 2014

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |
| H04W 12/06 | (2009.01) |
| H04L 29/08 | (2006.01) |
| H04W 76/02 | (2009.01) |
| H04W 4/00 | (2009.01) |

(52) U.S. Cl.
CPC ............. *H04W 12/06* (2013.01); *H04L 63/083* (2013.01); *H04L 67/146* (2013.01); *H04W 76/021* (2013.01); *H04W 4/008* (2013.01)

(58) Field of Classification Search
CPC ....... H04L 67/146; H04L 67/14; H04L 63/08; H04L 63/083; H04W 76/021; H04W 4/008; H04W 12/06; H04B 5/0075; H04B 5/00
USPC .......................................................... 726/4
See application file for complete search history.

(56) References Cited

U.S. PATENT DOCUMENTS

| | | | | |
|---|---|---|---|---|
| 2005/0033692 | A1* | 2/2005 | Jarman et al. ................... | 705/41 |
| 2005/0160098 | A1* | 7/2005 | Campbell et al. ............... | 707/10 |
| 2006/0010203 | A1* | 1/2006 | Mrsic-Flogel et al. ....... | 709/205 |
| 2009/0124234 | A1 | 5/2009 | Fisher et al. | |
| 2011/0112920 | A1 | 5/2011 | Mestré et al. | |

(Continued)

FOREIGN PATENT DOCUMENTS

| | | |
|---|---|---|
| EP | 1194905 B1 | 4/2002 |
| EP | 2463833 A1 | 6/2012 |
| WO | 2006095212 A1 | 9/2006 |
| WO | WO 2010067222 A2 * | 6/2010 |
| WO | 2011083471 A1 | 7/2011 |

OTHER PUBLICATIONS

Pasquet, M., Reynaud, J., & Rosenberger, C., "Payment with mobile NFC phones—How to analyze the security problems", 2008 International Symposium on Collaborative Technologies and Systems. (see section 2).

(Continued)

*Primary Examiner* — Linglan Edwards
*Assistant Examiner* — Forrest Carey

(57) ABSTRACT

Aspects of various embodiments are directed to the communication of wireless data. In a particular embodiment, an apparatus includes a master/wireless communication circuit and a slave circuit that carries out a secure function. The master generates session initiation commands, and the slave is responsive to these commands by generating and storing a session ID. In response to the receipt and validation of user-input data, the slave accesses and locally stores the session ID. Upon the initiation of and/or during a wireless communication process, the slave again accesses the session ID and compares the accessed session ID with the locally stored session ID, and facilitates communication based on the comparison (e.g., communication is not permitted if the comparison does not indicate a match).

21 Claims, 2 Drawing Sheets

(56) References Cited

U.S. PATENT DOCUMENTS

Figure 1:
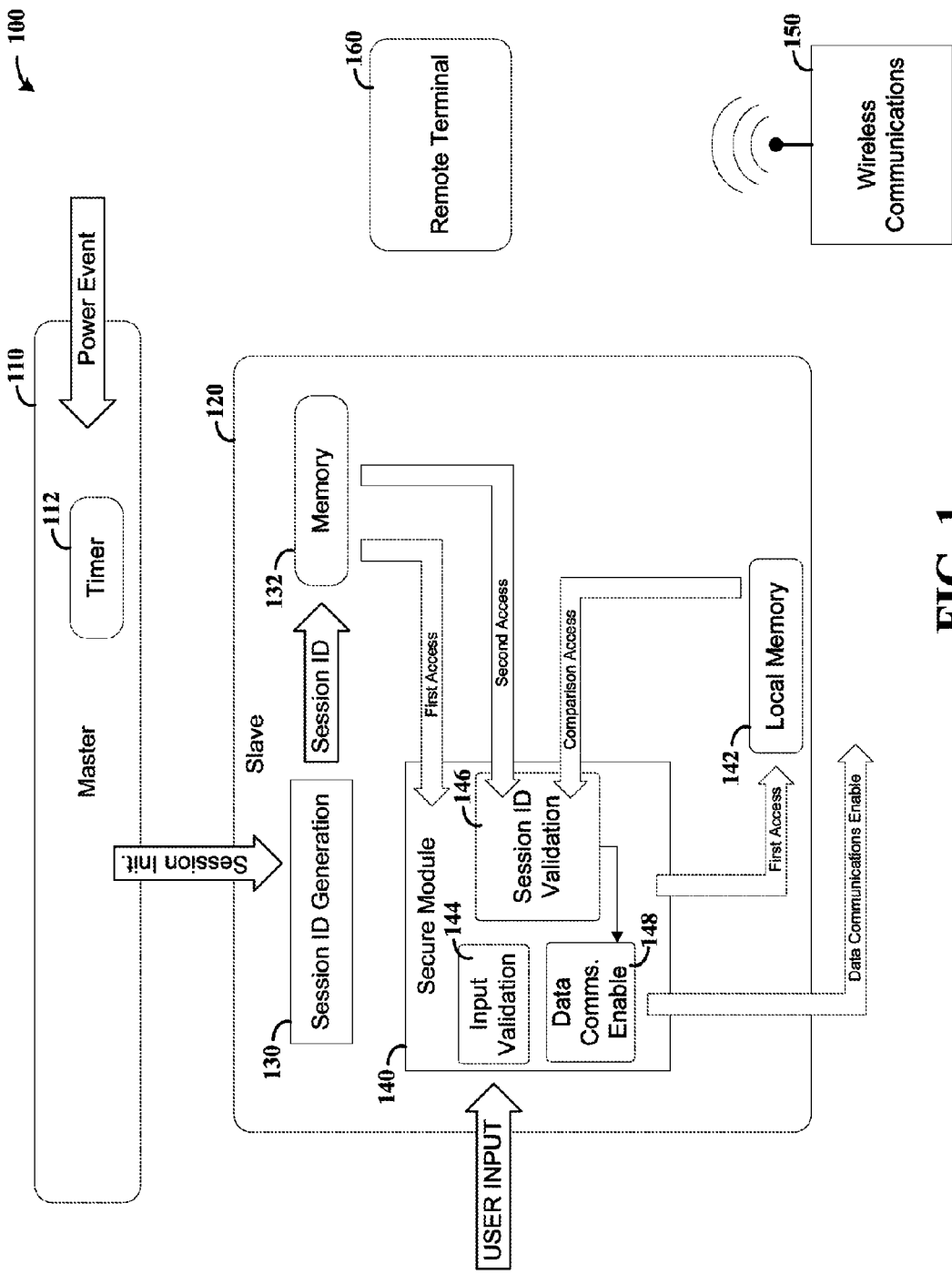

| | | | |
|---|---|---|---|
| 2012/0021722 A1 | 1/2012 | Phillips et al. | |
| 2012/0143706 A1 | 6/2012 | Crake et al. | |
| 2012/0149327 A1 | 6/2012 | Raboisson et al. | |
| 2013/0207786 A1* | 8/2013 | Hutzler et al. | 340/10.51 |
| 2013/0275695 A1* | 10/2013 | Ponsford et al. | 711/162 |

OTHER PUBLICATIONS

MasterCard, Mobile MasterCard PayPass—M/Chip 4, Technical Specifications, Version 1.0, Apr. 2010.

Extended European Search Report for EP Patent Application No. 13183002.8, European Patent Office, Jan. 28, 2014.

* cited by examiner

SECURE WIRELESS COMMUNICATION APPARATUS

Wireless communications circuits are widely used in local communications for a variety of applications benefitting from the secure or otherwise protected communication of data. For instance, portable devices such as telephones, tablets and others can be used to communicate wirelessly with a variety of other communications circuits. Other types of wireless communication circuits are used to control access, or enable operation of other circuits (e.g., in vehicles). These and other implementations can be useful in a variety of manners.

One particular type of wireless communication in which the security of communicated data is important involves the communication of payment authorization data with terminals, such as to carry out credit-based transactions with a mobile device, at a point-of-sale and/or otherwise involving wireless communication. For such communications, various requirements/specifications have been implemented to define the manner in which such data is to be communicated. Mobile devices carrying out such applications may include a wireless communication circuit, such as a radio frequency (RF) interface circuit, that operates in connection with a micro controller to execute a payment application.

To facilitate secure wireless communications, applets have been used within portable devices, such as within a mobile phone host, together with an RF interface. In many applications, a user input such as a personal identification number (PIN) is required to be provided by a user, generally via the mobile device, in order to authorize data communication (e.g., and therein authorize a transaction). In some implementations, such a user input is entered before a communication for a payment type transaction is effected (e.g., when a user wants to speed up the payment process). In other implementations, the user input is provided in response to a prompt, such as via the user's hand-held device or a payment terminal with which the hand-held device communicates.

While these approaches to communications are useful, the security of communicated data can be challenging to maintain. For instance, one or more sets of data corresponding to user inputs used in authorizing communication/payment is generally stored at least temporarily in order to facilitate the communication. Storing such data can lead to a security risk, particularly where the security data can be used in multiple transactions (e.g., such as a PIN). If a portable device is lost, stolen or otherwise unattended, the storage of such data could lead to unauthorized use. These and other matters have presented challenges to secure communications for a variety of applications.

Various example embodiments are directed to communications apparatus and their implementation.

In accordance with one or more embodiments, an apparatus includes master and slave circuit modules that carry out communication of data using a secure verification approach. The master generates session initiation commands, and the slave is responsive to these commands by generating and storing a session ID. In response to the receipt and validation of user-input data, the slave accesses and locally stores the session ID. Upon the initiation of and/or during a wireless communication process, the slave again accesses a current version of the session ID and compares the current session ID with the locally stored session ID. The slave then facilitates communication based on the comparison, such that communication is not permitted if the comparison does not indicate a match.

In accordance with another embodiment, an apparatus includes a wireless communication circuit that sends and receives wireless communications, and first (e.g., master) and second (e.g., slave) circuits as follows. The first circuit includes a timer, operates the timer in response to user input data, and generates session initiation commands in response to at least one of a status of the timer and a power-based event. The second circuit includes a memory circuit and respective circuit-based modules including a session identification (ID) module and a communication module. The session ID module generates and stores a session ID in response to each session initiation command, with each session ID being different than other session IDs generated in response to session initiation commands. The communication module assesses the validity of the user input data and, in response to the user input data being determined to be valid, accesses the session ID stored by the session ID module and stores the accessed session ID in the memory circuit. The communication module also communicates data to the wireless communication circuit (e.g., for wireless communication to a remote device) as follows. A current version of the session ID stored by the session ID module is accessed and compared with the session ID locally stored in the memory circuit. The data is communicated to the wireless communication circuit in response to the current version of the session ID matching the session ID stored in the memory circuit. Various embodiments are also directed to method-based aspects of the above.

Another example embodiment is directed to an apparatus having a near-field communication circuit and a plurality of circuit-based modules as follows. A master communication module generates session initiation commands in response to event conditions including at least one of a timer event, a power event and a user input event. A slave module generates and stores a session ID in response to each session initiation command, validates received user-input data sets, and accesses and locally stores the generated session IDs for each data set. The slave module also carries out a contactless payment process by re-accessing the generated and stored session ID and comparing the re-accessed session ID with the locally stored session ID. If the comparison indicates that the re-accessed session ID matches the locally stored session ID, near-field communications are facilitated. If the comparison does not indicate that the re-accessed session ID and locally stored session ID match, the contactless payment process is terminated.

The above discussion/summary is not intended to describe each embodiment or every implementation of the present disclosure. The figures and detailed description that follow also exemplify various embodiments.

Figure 2:
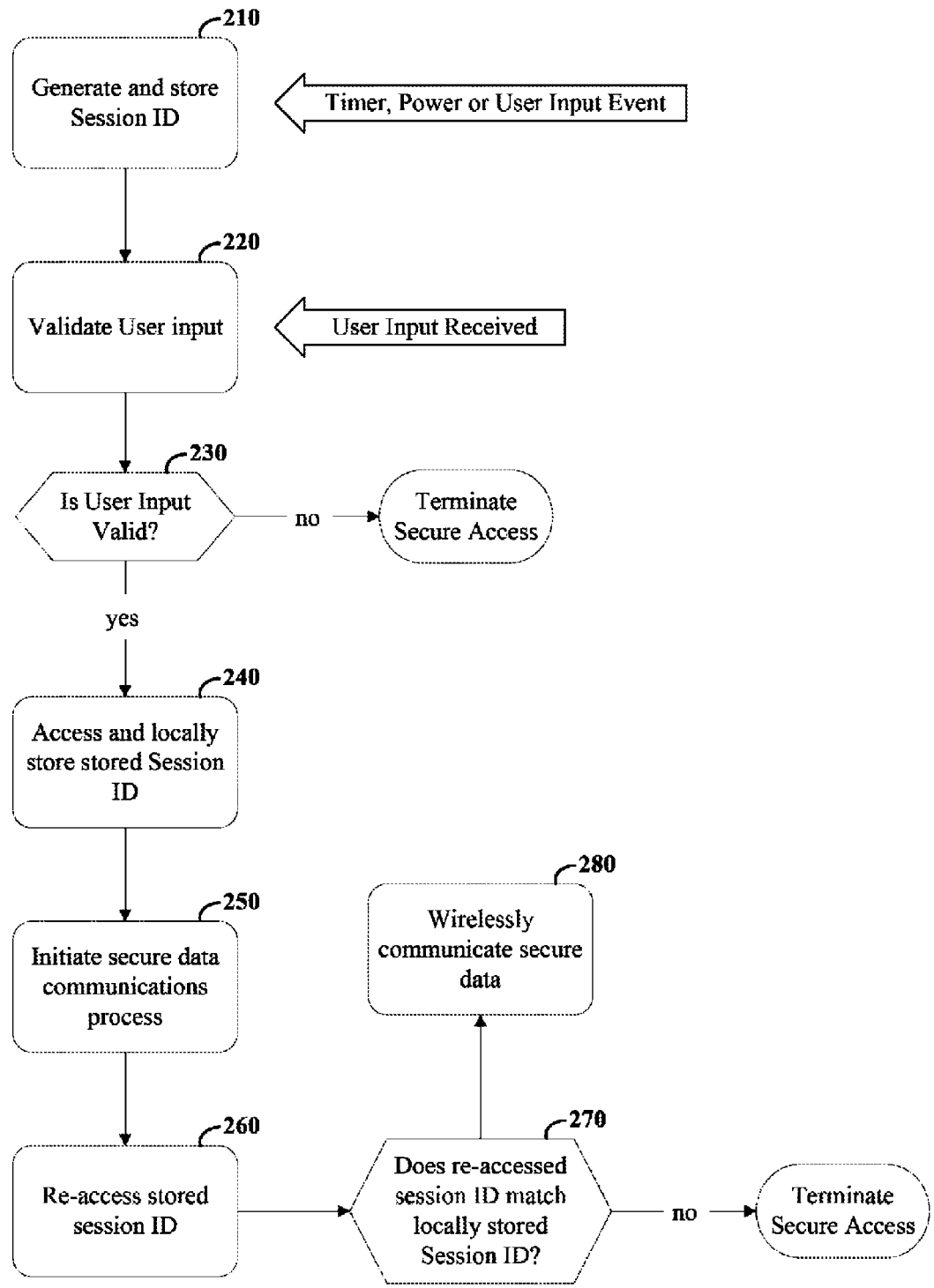

Various example embodiments may be more completely understood in consideration of the following detailed description in connection with the accompanying drawings, in which:

FIG. 1 shows a secure communication apparatus, in accordance with an example embodiment; and FIG. 2 shows a process flow for secure communications, in accordance with another example embodiment.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of different types of apparatuses, systems and methods involving the secure communication of data, such as between a portable device and another terminal for authorization. While not necessarily so limited, various aspects may be appreciated through a discussion of examples using this context.

Various example embodiments are directed to controlling the implementation of user-provided inputs for wireless transactions, such as by invalidating user inputs after a predetermined time period, or otherwise facilitating the wireless transactions responsive to such inputs for a limited or restricted period. In some implementations, user-provided data is invalidated or otherwise rendered unusable for facilitating wireless communications on a mobile device, without the interaction of an application operating/using the user-provided data on the device. More particular implementations are directed to invalidating or otherwise rendering a transaction ineffectual after a predetermined amount of time (e.g., 2 minutes), which can be used to mitigate subsequent unauthorized use. These and other approaches as described herein address challenges to secure communications including those discussed above.

In a more particular embodiment, a user-provided input such as a personal identification number (PIN) is received, validated and used at a portable device to trigger the generation and storage of a unique data set (e.g., a random number, or session ID). This data set is accessed and also stored by a secure component operating on the device. Upon subsequent operation/implementation of a wireless transmission (transaction), the generated data set is again accessed and compared with the data set stored by the secure component. If the comparison indicates a match, the wireless transmission is permitted. If the comparison fails to indicate a match, the wireless transmission is not permitted (e.g., a proprietary data communication sequence is terminated), or other action may be taken to ensure the security of data, such as by invalidating all transaction-related data or altering a transaction status indicator (e.g., changing a "TRUE" value for PIN validation to "FALSE").

Using this approach, events that may occur between a time at which the user-provided input is validated, and a time at which a communication is effected, can be accounted for to ensure that the communication is valid and authorized. Such events may, for example, involve a power event (e.g., where a device is powered off, mid-transaction, previous authorization is desirably rendered ineffective), or a timer event in which a resulting communication is delayed.

In accordance with another embodiment, an apparatus includes a wireless communication circuit that sends and receives wireless communications, a master circuit and one or more slave circuits as follows. The master includes a timer, operates the timer in response to user input security data, and generates session initiation commands in response to at least one of a status of the timer and a power-based event. The slave includes respective circuit-based modules including a session identification (ID) module and a communication module. The session ID module generates and stores a session ID in response to each session initiation command, with each session ID being different than other session IDs generated in response to session initiation commands. The communication module assesses validity of the user input security data and, in response to the user input data being determined to be valid, accesses the session ID stored by the session ID module and locally stores the accessed version of the session ID. The communication module also communicates data to the wireless communication circuit (e.g., for communication to a remote device) as follows. A current version of the session ID stored by the session ID module is accessed and compared with the locally stored session ID. Data is communicated to the wireless communication circuit in response to the current version of the session ID matching the session ID stored in the memory circuit.

In various embodiments, the wireless communications are carried out using approaches as described herein. A wireless communication circuit as in the above embodiment includes a wireless communication circuit that sends and receives wireless communications, a master circuit and one or more slave circuits as follows. Such wireless communication may be effected, for example, by touching devices together or bringing devices into close proximity, such as within a few centimeters.

The various embodiments described herein can be implemented using one or more of a variety of types of circuits, hardware, master and slave devices. In some embodiments, a master device is similar to and/or includes a PN544 near-field communication (NFC) frontend chip, and a slave device includes a SmartMX contact interface controller, both available from NXP Semiconductors of Eindhoven, The Netherlands. The master device communicates with the slave device, forwards received communications to the slave device, and detects events (such as a mobile phone power up/power off and/or timer expiration) that are used in generating a unique data set as discussed herein. The slave device (or devices) executes secure functions (e.g., for communicating proprietary banking information), and can be operated such that it is not powered at all times. Near-field communications are effected using this approach, such as for the communication of contactless payment information, for establishing network presence, or other near-field (e.g., within a few centimeters) communication.

The respective operations taken to facilitate and, as appropriate, invalidate/inhibit wireless transactions can be implemented in a variety of manners. In some embodiments, such steps are carried out as follows with a user implementing a mobile device to effect a wireless (contactless) payment transaction, by providing a secure PIN number that is used to facilitate wireless transactions involving the transmission of proprietary data between the mobile device and a payment-type of terminal, which in turn facilitates electronic payment. A near-field communication (NFC) frontend/master chip operates to effect the wireless communication, and a slave circuit operates to facilitate the provision and transmission of the proprietary data.

Before the mobile device user enters the PIN, the NFC frontend sends a command to the slave to indicate that a new session has been started. As soon as the slave receives this command, a global accessible applet on the slave generates a new secure session ID. Such a session ID may, for example, be generated based on a true random number, or upon a mathematical operation such as by numerically incrementing or modifying the session ID. This session ID is stored in persistent memory via the globally accessible application as it runs on the slave.

When the user enters the PIN, a payment application verifies the PIN, accesses the session ID from the global accessible applet in response to the verification, and stores the session ID in a local persistent memory (that is different than the aforesaid persistent memory). The NFC frontend also starts a timer when it detects that the PIN was provided for verification. During the contactless payment process, the payment application again gets the session ID from the global accessible applet. It verifies the (current) received session ID against the value stored in the local persistent memory. If the session IDs match, wireless communication functions associated with the payment process are continued. If the session IDs do not match, the wireless communication functions associated with the payment process are aborted.

When the timer on the master expires, it sends another command to generate a new session ID, to the global accessible application on the slave. The global application then generates and stores a new secure session ID. Upon any subsequent attempt to further a wireless communication process, a comparison of the locally-stored session ID (a previous session ID) with the current version of the session ID generated upon expiration of the timer results in a mismatch, and as a consequence the payment transaction fails.

To address the need to invalidate the PIN when the mobile device is switched on, the NFC frontend also sends the command to generate a new session ID upon such a power event. In some implementations, the NFC frontend is connected to the mobile device battery and detects mobile phone power up, and an indication of the power up event is forwarded to the slave, which operates to generate a new session ID (e.g., via a global application), and correspondingly facilitate payment.

Turning now to the figures, FIG. 1 shows a communication apparatus 100, in accordance with another example embodiment. The apparatus 100 includes a master circuit component 110, and a slave circuit component 120. The master 110 includes a timer 112, and receives and communicates user input data to the slave 120. The timer 112 is started upon receipt of the user input data, and the master 110 communicates a session initiation command to the slave in response to one or more of a power condition (e.g., the apparatus being powered on), receiving the user input and/or a condition of the timer 112 (e.g., the expiration thereof).

The slave 120 includes a session ID generator 130, memory 132, a secure module 140, and local memory 142. The secure module 140 includes an input validation module 144, a session ID validation module 146, and a data communications enable module 148. The slave 120 operates to validate user input data, and to ensure that a status relating to the validation is appropriately used in communicating data, via wireless communications circuit 150, to a remote terminal 160.

More specifically, the slave 120 is responsive to the session initiation command by generating a new session ID via module 130. This session ID is stored in memory 132. In response to the receipt of a user input such as a personal identification number (PIN), the secure module 140 operates to validate the user input at 144. As discussed above, the timer 112 is also started in response to the receipt of the user input.

If the user input is validated (e.g., if a user's PIN matches a stored or otherwise accessed PIN), the secure module executes a first access to retrieve the session ID from memory 132, and stores the accessed session ID in the local memory 142. When the slave 120 is ready to communicate data to the remote terminal 160 (e.g., after one or more steps in a transaction have been carried out), the secure module 140 again accesses a current version of the session ID from memory 132, and compares the currently-accessed session ID with the session ID locally stored in local memory 142. If an event such as the expiration of the timer 112 or a power condition has occurred in the meantime, the master 110 sends the session initiation command again, and the session ID generator 130 will have generated a new session ID such that the currently-accessed session ID will not match the locally stored session ID. Under these conditions, the communications process is terminated/aborted. On the other hand, if the locally stored session ID at memory 142 matches the current version of the session ID at memory 132, the communication is permitted and wireless communications circuit 150 communicates data to the remote terminal 160.

In some embodiments, the secure module 140 operates to undergo a reset operation, after validating a user input and before communicating data via wireless communications circuit 150. This approach can be used to facilitate an assurance that data is appropriately communicated.

In accordance with various embodiments, the components shown in FIG. 1 are implemented in a collective or separate arrangement, while implementing similar functionality. For instance, the local memory 142 may be part of the secure module 140. Similarly, the session ID generator at block 130, and the memory 132, may also be implemented in the secure module 140. Further, the respective memories 132 and 142 can be implemented as a common memory, with respective session ID values being stored in different locations therein. In addition, some embodiments are directed to components of the apparatus 100, such as the slave 120, and other embodiments are directed to larger components such as an apparatus including the wireless communication circuit 150, or a system including the remote terminal 160. Other embodiments are further directed to the inclusion of a user input device, such as a touch screen, that provides the user input for the master 110.

Further, such inclusion of various modules together and/or separate may be implemented via a computer-based module including stored programming that, when executed, carries out the corresponding functions. Such embodiments may, for example, involve a microcontroller that executes the program data, such as to implement the session ID and secure payment modules, responsive to the session initiation commands.

FIG. 2 shows a process flow for secure communications, in accordance with another example embodiment. The approach shown in FIG. 2 may, for example, be carried out using an apparatus such as shown in FIG. 1, or as similarly implemented. At block 210, a session ID is generated and stored, responsive to an event such as a power event, user input, or a timer expiration (e.g., and in response to a session initiation command). At block 220, a received user input is assessed for validity. If the user input is not valid at block 230, secure access/communication is terminated.

If the user input is valid at block 230, the process continues, such as to carry out further payment steps in a transaction, in which a session ID is accessed and locally stored at block 240. Secure data communications are initiated at block 250, and a current version of the session ID stored at block 210 is again accessed at block 260. At block 270, if the current version of the session ID matches the session ID stored at block 240, secure data is wirelessly communicated at block 280. If the current version of the session ID does not match the session ID stored at block 240, the process terminates or otherwise aborts.

Various modules may be implemented to carry out one or more of the operations and activities described herein and/or shown in the figures. In these contexts, a "module" is a circuit that carries out one or more of these or related operations/activities (e.g., validating PINs, generating and storing session IDs, comparing session IDs, and others). For example, in certain of the above-discussed embodiments, one or more modules are discrete logic circuits or programmable logic circuits configured and arranged for implementing these operations/activities, as in the circuit modules shown in FIG. 1. Such modules may, for example, be implemented as part of a portable device such as a mobile telephone. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, certain modules include a combination of a CPU hardware-based circuit and a set of instructions in the form of firmware. In such an example, a first module may include a CPU hardware circuit with one set of instructions and a second module may include a second CPU hardware circuit (or the same CPU hardware circuit) with another set of instructions. Such modules may further implement circuit structures and/or functions as described in the above-referenced components available from NXP Semiconductors.

Certain embodiments are directed to a computer program product (e.g., nonvolatile memory device), which includes a machine or computer-readable medium having stored thereon instructions which may be executed by a computer (or other electronic device) to perform operations/activities as described herein.

Based upon the above discussion and illustrations, those skilled in the art will readily recognize that various modifications and changes may be made to the various embodiments without strictly following the exemplary embodiments and applications illustrated and described herein. For example, different types of front end/master and slave circuits can be used, and different types of events can be used as a basis for triggering certain actions. Wireless communications for a variety of systems and communication types can be used, such as in wireless networking, payment communications, vehicle/systems operation and others. In addition, various embodiments described in connection with circuits may be implemented as method-based embodiments, and the described method-based embodiments may be implemented with a variety of different types of circuits. Such modifications do not depart from the true spirit and scope of various aspects of the invention, including aspects set forth in the claims.

What is claimed is:

1. An apparatus comprising:
   a wireless communication circuit configured and arranged to send and receive wireless communications;
   a first circuit having a timer and configured and arranged to start the timer in response to user input data, and to generate session initiation commands in response to at least one of a status of the timer and a power-based event;
   a second circuit having a memory circuit and configured and arranged with
      a session identification (ID) module configured and arranged to generate and store a session ID in response to each session initiation command, each session ID being different than other session IDs generated by the session ID module in response to the session initiation commands, and
      a communication module configured and arranged to assess validity of the user input data and, in response to the user input data being determined to be valid, access the session ID stored by the session ID module, and store the accessed session ID in the memory circuit, and
      communicate data to the wireless communication circuit for wireless communication to a remote device by accessing a current version of the session ID stored by the session ID module and comparing the current version of the session ID with the session ID stored in the memory circuit, and by communicating the data to the wireless communication circuit in response to the current version of the session ID matching the session ID stored in the memory circuit.

2. The apparatus of claim 1, wherein the first circuit is configured and arranged to send a new session initiation command to the session ID module in response to the timer expiring.

3. The apparatus of claim 1, wherein the first circuit is configured and arranged to send a new session initiation command to the session ID module in response to a power-on command for the apparatus.

4. The apparatus of claim 1, wherein the communication module is configured and arranged to assess validity of the user input data by accessing and using stored data to determine that the user input data is valid.

5. The apparatus of claim 1, wherein the first circuit is configured and arranged to render the session ID stored in the memory circuit invalid by, in response to at least one of the timer expiring and a power-up command being received after the communication module has validated the user input data, generating a new session initiation command that causes the generation of a new session ID that is different than the session ID stored in the memory circuit.

6. The apparatus of claim 1, further comprising a user-input circuit configured and arranged to receive the user input data.

7. The apparatus of claim 1, wherein the session ID module includes at least a portion of the second circuit and stored program data executed by the portion of the second circuit to generate and store the session ID.

8. The apparatus of claim 1, wherein the communication module includes at least a portion of the second circuit and stored program data executed by the portion of the second circuit to assess the validity of the user input data, access and store the session ID stored by the session ID module, and communicate the data.

9. The apparatus of claim 1, wherein
   the first and second circuits are integrated on a chip,
   the second circuit includes a microcontroller and stored program data, the microcontroller being configured and arranged to execute the program data to implement the session ID and communication modules, and
   the first circuit is responsive to a power-cycle of the apparatus by generating a session initiation command, the microcontroller being responsive to the session initiation command by implementing the session ID module to generate and store a new session ID, prior to implementing the communication module.

10. The apparatus of claim 1, wherein the second circuit is configured and arranged to undergo a reset operation, after determining the user input data to be valid and before the communicating data to the wireless communication circuit, and to terminate communication of data in response to a current version of the session ID accessed after the reset operation being different than the session ID stored in the memory circuit.

11. The apparatus of claim 1, wherein the wireless communication circuit is a near-field communications circuit, and wherein the communication module is configured and arranged to communicate the data by communicating unsecured data to the wireless communication circuit for near-field communication.

12. The apparatus of claim 1, wherein
   the memory circuit includes non-volatile memory,
   the session ID module is configured and arranged to store the session ID in non-volatile memory designated to the session ID module and accessible by the communication module,
   the communication module is configured and arranged to store the accessed session ID and to store data indicative of the user input data being determined to be valid in non-volatile memory designated to the communication module, the second circuit is configured and arranged to undergo a reset operation in which power to the second circuit is interrupted, after storing the accessed session ID and the data indicative of the user input data being determined to be valid, and before the communication module accesses the current version of the session ID stored by the session ID module and compares the current version of the session ID with the session ID stored in the memory circuit.

13. A method comprising:

starting a timer in response to user input data;

generating session initiation commands in response to at least one of a status of the timer, a power-based event, and receipt of a user input;

generating and storing a session ID in a session ID module of a device, in response to each session initiation command, each session ID being different than other session IDs generated in response to the session initiation commands;

assessing validity of the user input data;

in response to the user input data being determined to be valid, accessing the stored session ID and locally storing the accessed session ID in a memory circuit of the device separate from the session ID module;

after locally storing the accessed session ID, accessing and comparing a current version of the generated and stored session ID with the locally stored session ID; and communicating data to a wireless communication circuit in response to the comparison indicating that the current version of the session ID matches the locally stored session ID.

14. The method of claim 13, wherein generating and storing a session ID in response to each session initiation command includes generating a new session ID in a first circuit and storing the new session ID in a first non-volatile memory, locally storing the accessed session ID includes storing the accessed session ID in a second non-volatile memory that is different than the first non-volatile memory, and accessing and comparing a current version of the generated and stored session ID with the locally stored session ID includes using a second circuit that is different than the first circuit to access the new session ID from the first non-volatile memory and to compare the new session ID with the locally stored session ID in the second non-volatile memory corresponding to a previous version of the session ID, and in response thereto, aborting a communication process for communicating the data to the wireless communication circuit.

15. The method of claim 13, further including rendering the generated and stored session ID invalid by, in response to at least one of the timer expiring and a power-up command being received after the user input data has been assessed as being valid, generating a new session initiation command that causes the generation of a new session ID that is different than the stored session ID.

16. The method of claim 13, wherein the recited steps are carried out by a common computer circuit that accesses and executes stored program data.

17. The method of claim 13, wherein the steps of starting a timer and generating session initiation commands are carried out in a master circuit coupled to a near-field communication circuit, and the steps of generating and storing a session ID, assessing validity, accessing the session ID, and accessing and comparing the current version of the session ID with the locally stored session ID are carried out in a slave circuit that executes a payment application that facilitates or aborts the communication of the data to the wireless communication circuit respectively based upon the comparing indicating a match or a mismatch.

18. The method of claim 13, where the respective steps of accessing and comparing are carried out in a microcontroller, further including, in response to the user input data being determined to be valid and after the session ID has been accessed and locally stored, executing a reset operation in which power is reset to the microcontroller, prior to accessing and comparing the current version of the generated and stored session ID with the locally stored session ID, in response to the comparison indicating that the locally stored session ID is different than the current version of the session ID, aborting communicating of the data to the wireless communication circuit, and wherein communicating the data to the wireless communication circuit includes communicating the data in response to the comparison indicating that the locally stored session ID matches the current version of the session ID.

19. An apparatus comprising:

a near-field communication circuit; and a plurality of circuit-based modules, including a master communication module configured and arranged to generate session initiation commands in response to event conditions including at least one of a timer event, a power event and a user input event, a slave module configured and arranged to carry out a contactless payment process by generating and storing a session ID in response to each session initiation command, validating received user-input data sets, for each validated user-input data set, accessing and locally storing the generated session ID, after locally storing the generated session ID, re-accessing the generated and stored session ID, and comparing the re-accessed session ID with the locally stored session ID, in response to the comparing indicating that the re-accessed session ID and the locally stored session ID match, facilitate near-field communication of proprietary payment data stored at the apparatus for access by a payment terminal in near-field communication with the apparatus, and in response to the comparing indicating that the re-accessed session ID and the locally stored session ID do not match, abort the contactless payment process.

20. The apparatus of claim 19, wherein the slave module includes a payment module comprising a microcontroller and an applet defined by programming data that, when executed by the microcontroller, carries out the steps of validating the user-input data sets and facilitating near-field communication.

21. The apparatus of claim 19, wherein the near-field communication circuit and master communication module are integrated on a frontend chip, the slave module is a secure payment application module executed by a microcontroller that executes stored program data to generate and store the session ID, validate the user-input data sets, locally store the generated session ID, and to carry out the contactless payment process, the slave module being configured and arranged to reset after validating the received user-input data sets and before re-accessing the generated and stored session ID.

* * * * *